No. 639,848. Patented Dec. 26, 1899.
E. EVANS.
ACETYLENE GAS GENERATING LAMP.
(Application filed Dec. 9, 1897.)
(No Model.)
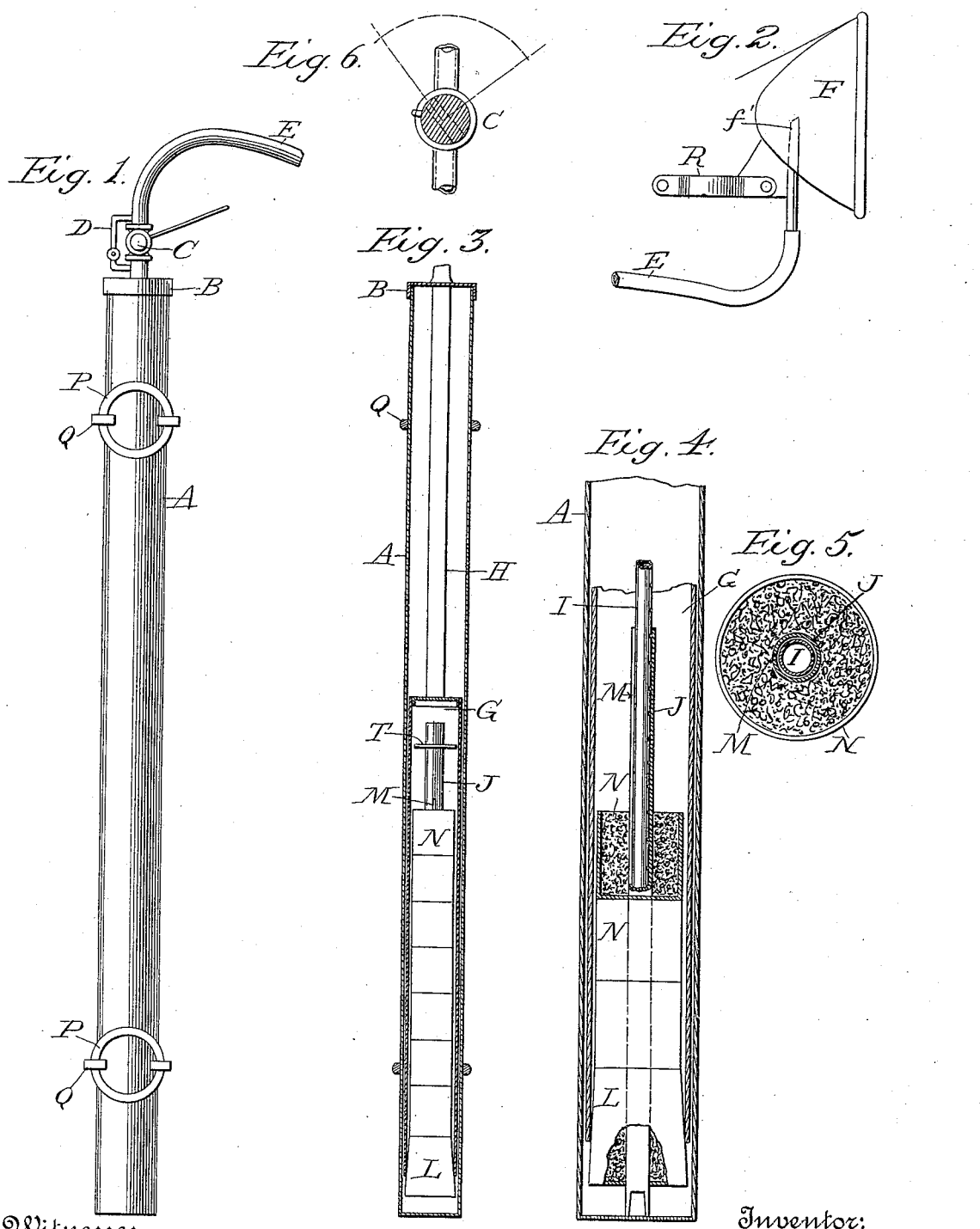

UNITED STATES PATENT OFFICE.

EVAN EVANS, OF LLANRWST, ENGLAND, ASSIGNOR, BY MESNE ASSIGNMENTS, TO THE IMPERIAL S. C. ACETYLENE GAS COMPANY, LIMITED, OF MANCHESTER, ENGLAND.

ACETYLENE-GAS-GENERATING LAMP.

SPECIFICATION forming part of Letters Patent No. 639,848, dated December 26, 1899.

Application filed December 9, 1897. Serial No. 661,278. (No model.)

*To all whom it may concern:*

Be it known that I, EVAN EVANS, a subject of the Queen of Great Britain, residing at Llanrwst, in the county of Denbigh, in the Principality of Wales, England, have invented certain new and useful Improvements in Acetylene-Lamps, of which the following is a specification.

This invention has for its object primarily a bicycle-lamp. It is obvious, however, that is is equally applicable to almost any other form of lamp. It is best described by aid of the accompanying drawings, showing a lamp as actually used on a bicycle.

Figure 1 shows the generator with its india-rubber rings for attachment to a vertical or oblique portion of a bicycle-frame; Fig. 2, a view of the lamp and its attachment to the bicycle-fork; Fig. 3, a sectional view of the generator; Fig. 4, an enlarged sectional view of part of the generator; Fig. 5, a transverse section of the same; Fig. 6, a section of tap when used also as a by-pass.

In the drawings, A is a cylinder, of metal, closed at the bottom and having a cap B screwed on at the top. This cap has a tap C and a by-pass D, or the tap is arranged in such manner that when the handle is turned to one side it will entirely close the opening, or the stop of the cock is so arranged that when the handle is turned to the stop on the other side it will not quite close the opening, but will leave a small by-pass, and when standing vertically it will be fully open. E is an india-rubber tube connecting this cock with the lamp F.

F is a parabolic reflector-lamp, preferably with a glass in front, a shield or cap of the usual description for the wind up above, and a glass burner or bearing *f'* at the end of the pipe.

G is an air-chamber closed at the top, except for tube H, which is connected through cap B with the cock C. This chamber is open at the bottom, as shown.

I is a tube closed at the top, but open at the bottom. This tube I is perforated at intervals, as shown. J is a second tube fitting loosely around tube I and having on the opposite side to the perforations in tube I an open slit, (shown in Fig. 5 as M.) Attached by solder or otherwise to this tube J is a cylinder L, open at its upper end, and above L a series of other cylinders N a little shorter. Each of these has a hole O in the bottom and is threaded onto the tube J. Each of these cylinders is filled about one-third full with calcium carbid.

T is a disk fastened on the tube J, so as to keep the cylinders N always on the tube. The bottom cylinder L fits tightly in tube G. Consequently it is drawn out with tube G when the cylinders have to be replenished. It can, however, be pulled off from tube G by a smart pull.

The mode of operation is as follows: The cylinders L and N being supplied with carbid and the apparatus arranged in the form shown, the cock C is closed, the lid B unscrewed and lifted, and cylinder A filled to near the top with water. The cap B is screwed on. The water percolates up through the tubes I and J and enters the first cylinder L and attacks the carbid, producing sufficient acetylene to fill the tube G to the required pressure to prevent further water entering. Any time the lamp is required the cock C is turned full on and the burner *f'* lighted. At any time the burner is not required in order to save lighting afresh the handle of cock C, if there be no by-pass, is moved into the position shown by dotted lines, Fig. 6. In this position the cock allows a slight leakage of acetylene, so that the light continues burning very low. At any moment, however, it can be turned full on by moving the cock by the handle. The holder A is fastened to any vertical or sloping portion of the frame by the india-rubber rings P, which are taken out of the hook Q, placed around the frame, and again hooked over the hook Q. The lamp is fastened to the fork by the clamp R, or it can be fastened to the lamp-bracket. A cylinder A can also be carried about the person and the lamp used in the hand as a signal-lamp, or, if desired, the lamp can be attached directly to the cock C and the tube A used as an ordinary handle to carry it. The advantage of having the carbid in numerous little cylinders supplied with water only through one tube is that only a small amount of carbid is attacked at once. Consequently the cylinder does not get hot, whereas if there were but one single compartment the water would rush in and create a heavy pressure and a great heat at start.

By arranging the perforations in tube I upon that side opposite the slit M of tube J the water is caused to pass around tube I and is therefore regulated, as it were, preventing the lime from clogging up the perforations, as would be the case were the water admitted directly to the carbid therethrough.

I claim as my invention—

1. In an acetylene-generator, the combination of an outer water-chamber; a cap for closing the open end thereof; an inner chamber open at the bottom and closed at the top; a series of superimposed carbid-holders within said inner chamber, the lowermost holder being adapted to fit practically water-tight into the open bottom of said inner chamber; and a central pipe divided about midway of its length into two parts, the upper portion of said pipe forming a connection for the delivery of the gas from the upper end of the inner chamber, and the lower portion of said pipe being perforated and extending upwardly through the carbid-holders from the bottom of the inner chamber where it is open to the water-chamber, thereby forming a connection for the delivery of the water centrally to the carbid-holders.

2. In an acetylene-generator, the combination of a generating-chamber of uniform volume; a surrounding water-chamber, the two being in communication through a small orifice at the bottom of the generating-chamber; a perforated tube extending from said orifice up through the generating-chamber; and a series of carbid-holding trays superimposed upon each other within the generating-chamber and around the tube, whereby the admission of water thereto is regulated automatically and instantaneously by the pressure of the gas and not by mechanical movement.

3. The combination of the water-chamber A; generating-chamber G mounted therein; carbid-trays L, N, N, mounted in said chamber G and having openings in their bottoms; and a perforated tube open at its lower end to the water-chamber and extending up through the openings in the trays.

4. The combination with a generating-chamber of a water-tube perforated on one side at intervals and an inclosing shield open on the opposite side, whereby the perforations are protected from being stopped up by the lime.

5. The combination of the water-chamber A, the generating-chamber G, the perforated pipe I and the shield J having a longitudinal slit on the opposite side to the perforations in the pipe I.

In testimony whereof I have signed my name to this specification in the presence of two subscribing witnesses.

EVAN EVANS.

Witnesses:
  WM. P. THOMPSON,
  H. R. SHOOBRIDGE.